Sept. 6, 1932. F. B. WINES 1,876,268
HEATING APPARATUS FOR AUTOMOTIVE VEHICLES
Filed Sept. 23, 1929 3 Sheets-Sheet 1

INVENTOR
FRED B. WINES
By Paul, Paul Moore
ATTORNEYS

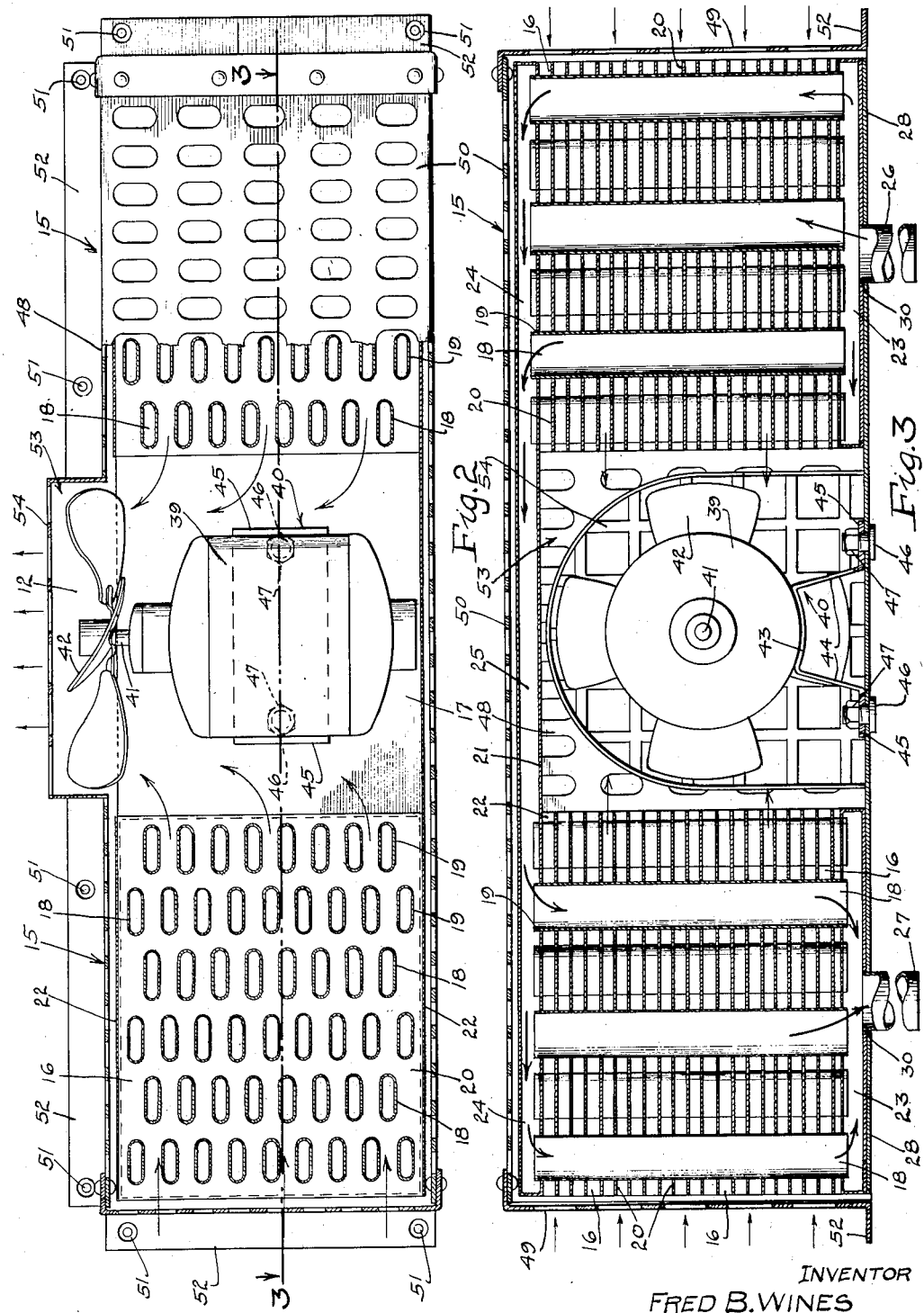

Sept. 6, 1932.   F. B. WINES   1,876,268
HEATING APPARATUS FOR AUTOMOTIVE VEHICLES
Filed Sept. 23, 1929   3 Sheets-Sheet 3

INVENTOR
FRED B. WINES
By
ATTORNEYS

Patented Sept. 6, 1932

1,876,268

UNITED STATES PATENT OFFICE

FRED B. WINES, OF MINNEAPOLIS, MINNESOTA, ASSIGNOR TO TROPIC-AIRE, INCORPORATED, OF MINNEAPOLIS, MINNESOTA, A CORPORATION OF DELAWARE

HEATING APPARATUS FOR AUTOMOTIVE VEHICLES

Application filed September 23, 1929. Serial No. 394,697.

This invention relates to an apparatus for heating automotive vehicles and has more particular reference to a heater adapted to rest upon the floor of a vehicle body, as, for example, in the rear compartment of a taxicab or other passenger automobile.

An object of the invention is to provide an automotive vehicle heater of the general type as disclosed in the application of Vernon J. Butterfield, Serial No. 341,403 filed February 20, 1929, and presenting certain improvements over the disclosure of said application.

A further object of the invention is to provide an automotive vehicle heater, more especially adapted to rest upon a vehicle floor, which will include a heating element and means for forcibly bringing air into contact with the heating element, to thus cause the air to be continuously heated and circulated within the vehicle body.

A still further object is to provide an automotive vehicle heater, more especially adapted to rest upon a vehicle floor, which will include a heating element having a plurality of air-circulating passages associated with water-circulating passages connected in the usual water-circulating system of a vehicle engine, and means for withdrawing air from the interior of the vehicle body through the air-circulating passages of the heating element and for returning the withdrawn air back into the vehicle body interior, to thus cause the said air to be continuously heated and kept in circulation within the vehicle body.

And a still further object is to provide a heating apparatus for an automotive vehicle, including a heating element, an air withdrawing and returning means, and an operative association of the heating element with the air withdrawing and returning means and with the air-heating water-circulating system of the vehicle engine, each and all having novel and improved features and characteristics of construction as now to be fully described, it being understood that the disclosure herein is merely illustrative and intended in no way in a limiting sense, changes and details of construction and arrangement of parts being permissible so long as within the scope of the claims which follow.

In the accompanying drawings forming a part of this specification:

Fig. 2 is an enlarged plan view, partially sectioned and partially broken away, of the heating element and the air withdrawing and returning means of the improved apparatus;

Fig. 3 is an enlarged vertical, longitudinal, sectional view of said heating element and air withdrawing and returning means, taken as on line 3—3 in Fig. 2, also disclosing the connections between the heating element and the vehicle engine water-circulating system;

Figure 1:
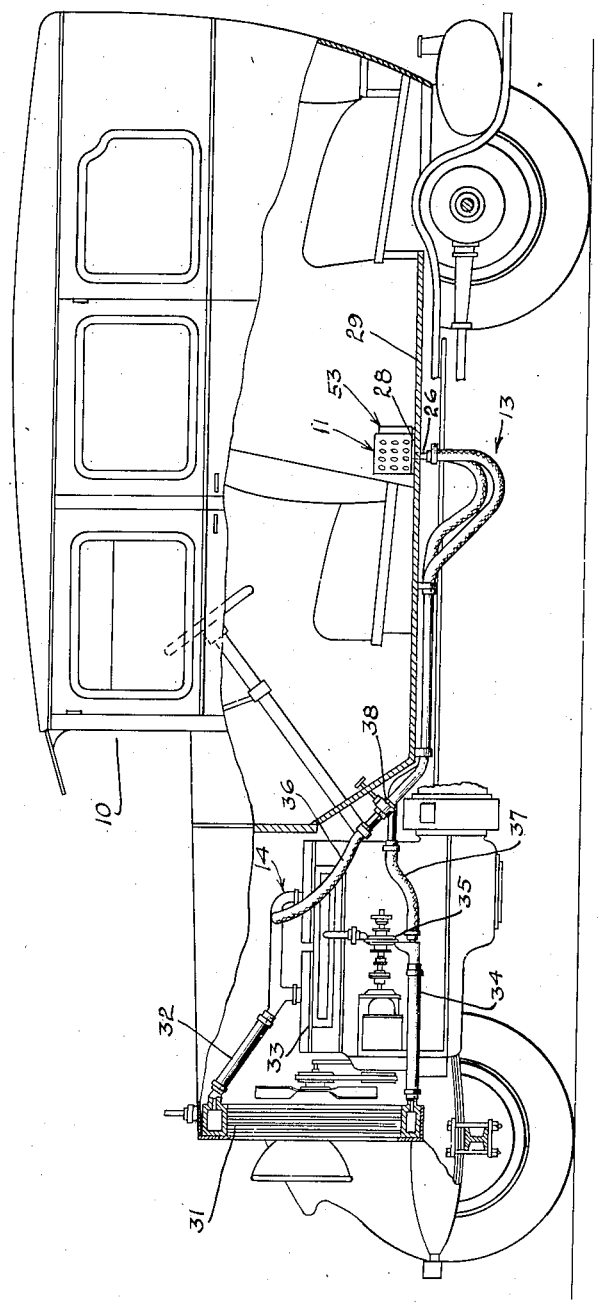
Fig. 1 is a side elevational view, partially sectioned and partially broken away, of an automotive vehicle, disclosing a heating apparatus, made in accordance with the present invention, associated with said vehicle, the heating element of said apparatus being situated upon the front portion of the floor of the rear compartment or tonneau of the vehicle.
Figure 5:
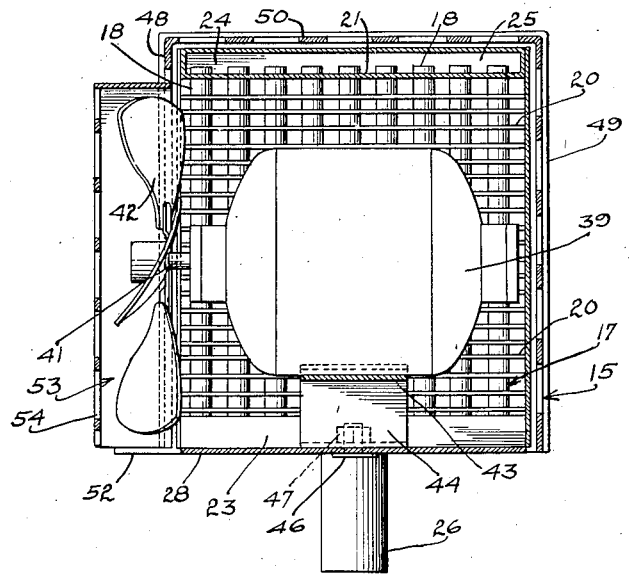
Fig. 5 is a transverse sectional view, taken substantially on line 5—5 in Fig. 4.

With respect to the drawings and the numerals of reference thereon, 10 denotes an automotive vehicle equipped with a heating apparatus consisting, generally, of a heating element 11, disclosed as resting upon the vehicle floor, means 12, disclosed as housed by said heating element, for forcibly circulating air through the heating element, and connections 13 between the heating element and the water-circulating system 14 of the vehicle engine. As shown in Fig. 1, the heating element 11 is situated upon the front portion of the floor of the rear compartment or tonneau of the vehicle, adjacent the front seat, but said heating element could be otherwise situated in the vehicle body, as, for example, upon the floor at the rear of the rear compartment or tonneau, adjacent the rear seat, or in the front compartment of the vehicle.

The heating element 11 includes a housing 15 having horizontally disposed air-circulating passages 16 spaced apart by a chamber 17 housing the air forcing means 12 desirably situated at the midlength of the heating element. The housing 15 also has two sets of water-circulating tubes or passages 18, including a set for each set of air-circulating passages 16, connected in the water-circulating system 14 of the vehicle engine and intimately contacted with by the air-circulating passages 16. The water-circulating tubes or passages 18 of each set of water-circulating tubes or passages may be located in spaced apart apertures 19 in spaced apart plates 20, defining the air-circulating passages 16, to constitute spaced apart interior units of the heating element. Desirably, the tubes or passages 18 snugly fit the apertures in the plates, and after assembly of the tubes or passages with the plates, the resulting interior units are dipped in solder, in order to fix the plates in spaced relation along the tubes and to provide water-seals between the perforations of the outermost plates and the said tubes or passages adapted to preclude the entry of water to position between the plates and tubes. The inner ends of the air-circulating passages open to the chamber 17 housing the air forcing means 12, and a cover 21 for the said chamber is desirably integral with opposite uppermost plates 20, said cover and uppermost plates being fitted against the side walls 22 of the interior units and sealed thereto, to render the upper portion of the chamber 17 water-tight. A water-tight casing for each interior unit of the heating element includes a bottom chamber 23 attached to the side and end marginal portions of the lowermost plate 20, the side walls 22 fitted and sealed against the side edges of said plates 20 and against the side edges of the bottom chamber 23, and a top chamber 24, common to both of said interior units, desirably integral with the side and end edge portions of the opposite, uppermost plates 20 and integral with or attached to the side edges of the cover 21 and providing a water passage 25, defined by said top chamber 24 and said cover 21, between the spaced apart interior units of the heating element. The bottom chamber 23, the one at the right in Fig. 3, which is situated beneath the lower ends of the tubes or passages 18 of the corresponding interior unit of the heating element, is communicated with by an inlet pipe 26, and communicates with the upper ends of the tubes or passages 18 of the opposite interior unit through the top chamber 24 and its water passage 25, while the bottom chamber 23, the one at the left in Fig. 3, situated beneath the lower ends of the tubes or passages 18 of the said opposite interior unit, communicates with an outlet pipe 27. The casings for the interior units rest upon a floor plate 28, and said floor plate in turn rests upon and is secured to the vehicle floor 29 in any suitable manner. The inlet and outlet pipes 26 and 27 pass downwardly through apertures 30 in the floor plate and through apertures (not shown) in the vehicle floor.

The construction and arrangement above described provides air-circulating passages through the heating element, leading from the interior of the vehicle body inwardly through each of the air-circulating passages of the different interior units of the heating element, to the chamber 17 housing the air forcing means 12. Provision is made for causing hot water to flow through the heating element 11, through the inlet pipe 26, the water-chamber 23 at the right in Fig. 3, the adjacent water-circulating tubes or passages 18, the connecting passage 25, the adjacent water-circulating tubes or passages 18, the water-chamber 23 at the left in Fig. 3, and the outlet pipe 27, so that air entering the chamber 17 from the vehicle body interior through the air-circulating passages 16 will be heated upon reaching said chamber 17.

Numeral 31 represents the water-cooling radiator of the vehicle engine, 32 denotes a connection between the water-jacket 33 of said engine and said radiator, 34 designates a connection between the radiator and the water-jacket, and 35 indicates a pump in the connection 34 for forcing a flow of cooling-water through the water-circulating system of the engine, from the upper portion of the water-jacket through the connection 32 to the radiator and from the radiator through the connection 34 and pump 35 back to the water-jacket, in the usual manner. A connection 36 leads from the connection 32 to the inlet pipe 26, and a connection 37 leads from the outlet pipe 27 to a portion of the connection 34 in advance of the water pump 35. An adjustable shut-off valve 38 is situated in the connection 36 as disclosed. By regulation of this shut-off valve, a portion of the water of the water-circulating system can, evidently, be caused to flow from the water-jacket through the connection 36 and the intake pipe 26, through the heating element, and back to the water-jacket, through the outlet pipe 27, the connection 37, and the pump 35 (in the connection 34). Clearly, an arrangement (such as disclosed in the reissue patent to Caesar, No. 17,131, granted November 13, 1928) adapted to cause all of the water of the water-circulating system to flow through the heating element, could be substituted for the arrangement illustrated and just described. When the shut-off valve 38 is closed, there will be no flow of water through the heating element, as will be obvious.

An electric motor 39, situated in the chamber 17 and supported upon the floor plate 28, as by a shaped bracket 40, includes a motor shaft 41 fixedly supporting an air blower 42. A motor of variant type could be substituted for the electric motor disclosed. As illustrated, the shaped bracket 40 includes a curved length of material 43 desirably attached to the lower portion of the motor 39, as by welding, outwardly and downwardly extending arms 44, and extensions 45 upon the arms 44 and resting upon the floor plate 28, alining openings in the floor plate and the extensions receiving small screw bolts 46. Numeral 47 represents nuts on the screw bolts for fastening the extensions 45 down against the floor plate.

The housing 15 of the heating element may include a perforated forward wall 48, perforated end walls 49 adjacent the inlet ends of the air-circulating passages 16, and a perforated top wall 50 above the hot water chamber 24. Said housing may be secured to the vehicle floor in any convenient manner, as by screws adapted to be inserted through openings 51 in flanges 52 of the housing, and the walls of the housing may be joined to each other in any ordinary or preferred way.

Figure 4:
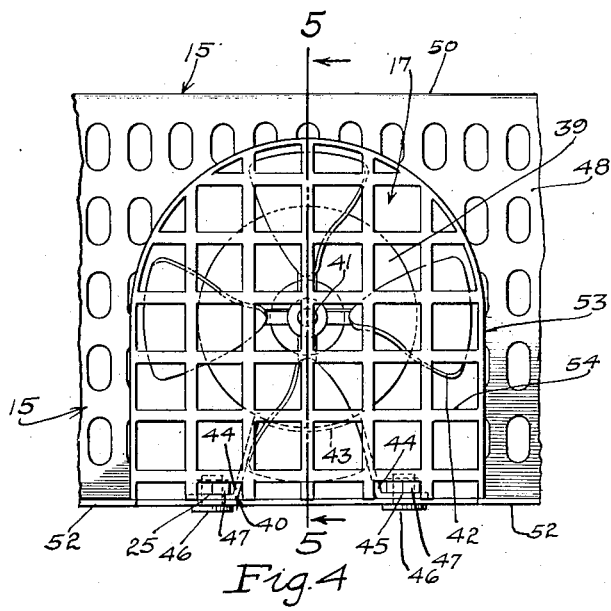
Fig. 4 is a fragmentary side elevational view of the heating element.

Adjacent the chamber 17, the forward wall 48 of the housing 15 is cut away to receive the inner edge portion of an extension chamber 53, which, together with the adjacent portion of the chamber 17, is adapted to house the air blower 42. As disclosed, more clearly in Fig. 4, the extension chamber 53 may desirably be of arched shape. The inner marginal side and upper edges of said extension chamber may be attached to the cut-away portion of the perforated forward wall 48 in any desired manner, while the lower wall of the arched extension chamber may be defined by a flange 52 of the housing 15. The forward wall 54 of the extension chamber may consist of a grating as shown, to constitute a hot air outlet opening directly to the interior of the vehicle body at position in advance of the forward wall 48 of the housing 15.

The air blower 42 is adapted to withdraw air from the interior of the vehicle body, through the perforated end walls 49 of the housing 15 and the outer ends of the air-circulating passages 16, inwardly through said air-circulating passages, and to return the heated air back into the vehicle body through the forward wall or grating 54.

Adjustment of the shut-off valve 38 regulates the amount of hot water allowed to flow through the heating element when the pump 35 is operating, and adjustment of the speed of rotation of the blower 42 regulates the amount of air withdrawn from the vehicle body through the air-circulating passages 16 and pushed back into the vehicle body through the hot air outlets of the grating wall 54. Evidently, when the blower 42 is in operation, the air within the vehicle body is caused to be continuously circulated, through the heating element 11 and the air forcing or withdrawing and returning means 12, to thus be heated by the hot water flowing through the water-circulating tubes or passages 18 and the hot water chambers 23 and 24 of the heating element. When the shut-off valve 38 is closed, so that no hot water is circulated through the heating element, the blower 42 can keep the air within the vehicle body in circulation without heating said air. The rate of circulation of air through the air-circulating passage 16 determines the rate at which heat is absorbed from the hot water flowing through the heating element. When the blower 42 is put out of operation while the valve 38 is open and the pump 35 is operating to force water through the heating element, but a small amount of heat will be dissipated to the interior of the vehicle body from the heating element.

I claim as my invention:

1. In combination, a heating element adapted to be positioned in a closed body and including a plurality of sets of air-circulating passages, the air-circulating passages of each set having their outer ends open to said closed body and the inner ends of the air-circulating passages of the different sets being arranged in spaced apart relation, means for supplying heat to said air-circulating passages, air propelling means adjacent the inner ends of said air-circulating passages at one side of said heating element for withdrawing air from said closed body and for returning said withdrawn air back into said closed body, the said air propelling means being adapted to cause the said withdrawn and returned air to travel through said air-circulating passages to thus be heated and kept in continuous circulation within the closed body, and a motor adapted to be supported upon the floor of said body between said air-circulating passages and having a shaft extending transversely of said heating element and supporting said air propelling means.

2. In combination, a heating element adapted to be positioned in a closed body and including a plurality of sets of air-circulating passages, the air-circulating passages of each set having their outer ends open to said closed body and the inner ends of the air-circulating passages being arranged in spaced apart relation, a chamber between the different sets of air-circulating passages, a perforated housing about said air-circulating passages and said chamber, an extension chamber associated with the wall of the perforated housing and having an air outlet opening, said extension chamber being in communication with said chamber, means for supplying heat to said air-circulating passages, a motor in said chamber, and air propelling means supported by said motor located at the general location of jointure between said chamber and said extension chamber for withdrawing air from said closed body and for returning said withdrawn air back into said closed body, the said air propelling means being adapted to cause the said withdrawn and returned air to travel through said air-circulating passages to thus be heated and kept in continuous circulation within the closed body.

3. In combination, a heating element adapted to be positioned in a closed body and including a plurality of sets of air-circulating passages, the air-circulating passages of each set having their outer ends open to said closed body and the inner ends of the air-circulating passages being arranged in spaced apart relation, a chamber between the different sets of air-circulating passages, a perforated housing about said air-circulating passages and said chamber, an extension chamber set into a cutout portion of a wall of the perforated housing and having an air outlet opening, said extension chamber being in communication with said chamber, means for supplying heat to said air-circulating passages, a motor in said chamber, and air propelling means supported by said motor and situated at least partially in said extension chamber adjacent its outlet opening.

4. The combination with a heating element including a housing adapted to be positioned upon the floor of a vehicle body, a plurality of spaced apart casings enclosed by said housing, each casing having air-circulating passages communicating at their outer ends with the vehicle body interior and at their inner ends with a chamber within said housing and between said casings, and a fluid-heating-medium passage associated with said air-circulating passages, of an air propeller in said housing at the general location of a side of said chamber adjacent the inner ends of outermost air-circulating passages, means for actuating said air propeller, and means for supplying a hot fluid to said fluid-heating-medium passage.

5. The combination with a heating element including a housing adapted to be positioned upon the floor of a vehicle body, a plurality of spaced apart casings enclosed by said housing, each casing having air-circulating passages communicating at their outer ends with the vehicle body interior and at their inner ends with a chamber within said housing and between said casings, and fluid-heating-medium passages associated with said air-circulating passages, of an air propeller in said housing at the general location of a side of said chamber adjacent the inner ends of outermost air-circulating passages, and a motor in said chamber having a shaft arranged transversely of said heating element supporting said air propeller, said motor being adapted to be supported upon said vehicle floor.

6. In a heater, the combination of an elongated open front casing a pair of heating elements disposed in spaced relation to one another in the open front of said casing and defining separate air passageways in the casing on opposite sides of an intermediate air passageway, and a power operated fan in said casing in the intermediate air passageway between the heating elements, said fan when operated being arranged to force air to circulate through the casing over the heating elements in a predetermined path, the air being caused to travel in one direction at the fan and in the opposite direction past the heating elements, whereby to deliver hot air from the casing.

7. In a heater, the combination of a pair of radiators disposed in laterally spaced relation substantially in the same plane with one another, the said radiators comprising top and bottom headers and cores therebetween communicating with the headers, the said radiators being arranged to have heating medium circulated therethrough, a casing enclosing the radiators leaving the fronts thereof exposed for the passage of air, there being a space between the backs of the radiators and the back wall of said casing for the passage of air therebetween, a wall between the radiators reaching from the top headers to the bottom headers to close the space between the radiators, said wall having an opening therein, and a power-driven fan in said casing in line with said opening.

8. In a heater, the combination of an elongated casing, radiators or equivalent heating elements disposed in opposite ends of said casing and having the fronts thereof exposed at the open front of said casing for the passage of air, the back wall of said casing being spaced from the backs of the radiators to permit passage of air therebetween, a sheet metal shroud for closing the front of the casing between said radiators having an opening therein for the passage of air therethrough, the opposite sides of said shroud having baffle portions projecting therefrom beyond the fronts of the radiators to separate the air passing in one direction through the last mentioned opening from the the air passing the radiators in the opposite direction, and a power driven fan in said casing operating in the opening in said shroud, said fan being arranged to cause air to flow in one direction through the shroud opening and in the opposite direction past the radiators for the delivery of hot air from the casing.

9. In a heater, the combination of a pair of heating elements disposed in spaced relation to one another, a casing enclosing said elements leaving one side thereof exposed for the passage of air, a power-operated fan in said casing in the space between the heating elements, said fan when operated being arranged to force air to circulate through the casing over the heating elements in a predetermined path, the air being caused to travel in one direction at the fan and in the opposite direction past the heating elements, whereby to deliver hot air from the casing, and a grating covering the exposed portions of the heating elements and serving to shield the fan therebetween.

10. In a heater, the combination of an elongated open front casing, a pair of heating elements disposed in spaced relation to one another in the open front of said casing and defining separate air passageways in the casing on opposite sides of an intermediate air passageway, a power-operated fan in said casing in the intermediate air passageway between the heating elements, said fan when operated being arranged to force air to circulate through the casing over the heating elements in a predetermined path, the air being caused to travel in one direction at the fan and in the opposite direction past the heating elements whereby to deliver hot air from the casing, and baffles on the front of the heater at opposite sides of the fan to separate the intermediate air passageway from the other air passageways.

11. In a heater, the combination of a pair of heating elements disposed in spaced relation to one another substantially in the same plane, a casing enclosing said elements leaving one side exposed for the passage of air, and a power operated fan disposed in said casing between and approximately in the same plane with the heating elements, the heating elements thereby defining separate air passageways in said casing on opposite sides of an intermediate air passageway at the fan, said fan when operated being arranged to force air to travel in a predetermined path, in one direction through the passageway at the fan and in the opposite direction through the other passageways whereby to deliver hot air from the casing.

12. In a heater, the combination of a pair of radiators disposed in spaced relation to one another substantially in the same plane, said radiators being arranged to have a heating medium circulated therethrough, an elongated casing having said radiators disposed in the opposite ends thereof leaving the fronts thereof exposed for the passage of air, and an electric motor and fan between said radiators disposed as a unit at least partly in the plane with the radiators, the said casing having the back wall thereof spaced from the backs of the radiators for the passage of air therebetween, said fan when operated being arranged to force air to travel in a predetermined path, in one direction at the fan and in the opposite direction through the radiators whereby to deliver hot air from the casing.

13. A heater as set forth in claim 7, wherein the radiators are interconnected for the circulation of the heating medium from one to the other, said heater including a pipe connecting the top headers of the two radiators, and a supply pipe connected to the bottom header of the one radiator, and a return pipe connected to the bottom header of the other radiator, the heating medium being thereby arranged to pass upwardly through the core of the one radiator and downwardly through the core of the other.

14. In a heater, the combination of a pair of heating elements disposed in spaced relation to one another, a casing enclosing said elements leaving one side thereof exposed for the passage of air, a power-operated fan in said casing in the space between the heating elements, said fan when operated being arranged to force air to circulate through the casing over the heating elements in a predetermined path, the air being caused to travel in one direction at the fan and in the opposite direction past the heating elements whereby to deliver hot air from the casing, a wall closing the space between the heating elements having an opening provided therein in which the fan is disposed for operation, and a grating covering the exposed portions of the heating elements and serving as a shield for the fan therebetween.

In witness whereof I have hereunto set my hand this 19 day of Sept., 1929.

FRED B. WINES.